(12) United States Patent
Miyake et al.

(10) Patent No.: US 12,723,115 B2
(45) Date of Patent: Sep. 1, 2026

(54) PROCESS FOR PREPARING CONJUGATED DIENE COMPOUND UTILIZING INTRAMOLECULAR SIGMATROPIC REARRANGEMENT REACTION

(71) Applicant: Shin-Etsu Chemical Co., Ltd., Tokyo (JP)

(72) Inventors: Yuki Miyake, Joetsu (JP); Yusuke Nagae, Joetsu (JP); Takeru Watanabe, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 639 days.

(21) Appl. No.: 18/322,680

(22) Filed: May 24, 2023

(65) Prior Publication Data

US 2024/0262943 A1 Aug. 8, 2024

(30) Foreign Application Priority Data

Jan. 13, 2023 (JP) ................................ 2023-003673

(51) Int. Cl.
*C08F 36/04* (2006.01)
*C07C 17/358* (2006.01)

(52) U.S. Cl.
CPC .................................... *C08F 36/04* (2013.01)

(58) Field of Classification Search
None
See application file for complete search history.

(56) References Cited

U.S. PATENT DOCUMENTS

2014/0275657 A1 9/2014 Miyake et al.
2019/0322614 A1 10/2019 Watanabe et al.

FOREIGN PATENT DOCUMENTS

JP 2014198714 A 10/2014
JP 2019189529 A 10/2019

OTHER PUBLICATIONS

Rondan, et al, "Ab Initio Transition Structures for 1,5-Sigmatropic Hydrogen Shifts of 1,3-Pentadiene and Cyclopentadiene," Tetrahedron Letters, vol. 25, No. 24, 2519-2522, 1984. (Year: 1984).*
English translation of office action issued for Japanese Application No. 2023-003673 (4 pages) (dated Aug. 20, 2025).
Destaillats, et al., "Directed sequential synthesis of conjugated linoleic acid isomers from delta7,9 to delta 12,14", European Journal of Lipid Science and Technology, 105:3-8 (2003).
Grodner, et al., "Sex propheromone of the pine tree lappet moth *Dendrolimus pini* and its use in attractant-based monitoring system", Pestycydy/Pesticides, 1-4:43-49 (2010).
Matikainen, et al., "1,5-Hydrogen Shift and Other Isomerization Reactions of Certain Ethyl Octadecatrienoates", Tetrahedron, 53(12):4531-4538 (1997).
O'Neal, et al., "The Thermal Unimolecular Isomerization of cis-Hepta-1,3-diene", International Journal of Chemical Kinetics, 11:343-347 (1970).
Harris et al. "A New Pheromone Race of Acrobasis nuxvorella (Lepidoptera: Pyralidae)" Journal of Economic Entomology, 101(3):769-776 (2008).
Tao et al. "Facile Synthesis of (Z,E)-9,11-Hexadecadienal, the Major Sex Pheromone Component of the Sugarcane Borer *Diatraea saccharalis*: An Efficient Strategy for Synthesis of (Z,E)-Dienic Pheromones" Synthetic Communications, 43:415-424 (2013).

* cited by examiner

*Primary Examiner* — Fred M Teskin
(74) *Attorney, Agent, or Firm* — Myers Bigel, P.A.

(57) ABSTRACT

The present invention relates to A process for preparing a conjugated diene compound, the process comprising: subjecting, to an intramolecular sigmatropic rearrangement reaction, a conjugated diene compound (1) of the following general formula (1), wherein Z represents a halogen atom, a methyl group, a hydroxy group, an acetoxy group, a formyl group, or an acetal, and n and m are, independently of each other, integers of 0 to 14, or a conjugated diene compound (2) of the following general formula (2), wherein Z, n, and m are as defined above, to obtain, respectively, a conjugated diene compound (3) of the following general formula (3), wherein Z is as defined above, and n and m are, independently of each other, integers of 0 to 14, with the proviso that m−1 is an integer of zero or more, or a conjugated diene compound (4) of the following general formula (4), wherein Z is as defined above, and n and m are, independently of each other, integers of 0 to 14, with the proviso that n−1 is an integer of zero or more.

(1)

(3)

(2)

(4)

3 Claims, No Drawings

PROCESS FOR PREPARING CONJUGATED DIENE COMPOUND UTILIZING INTRAMOLECULAR SIGMATROPIC REARRANGEMENT REACTION

TECHNICAL FIELD

The present invention relates to a process for preparing a conjugated diene compound utilizing an intramolecular sigmatropic rearrangement reaction.

BACKGROUND ART

Compounds having conjugated diene skeletons are widely found in nature. Examples of the sex pheromones of lepidopteran insects include (4E,6Z)-4,6-hexadecadienyl acetate, (4E,6Z)-4,6-hexadecadienol, and (4E,6Z)-4,6-hexadecadienal of the Persimmon fruit moth (scientific name: *Stathmopoda masinissa*); (9Z,11E)-9,11-tetradecadienyl acetate of the Oriental leafworm moth (scientific name: *Spodoptera litura*); and (7E,9Z)-7,9-dodecadienyl acetate of the European grapevine moth (scientific name: *Lobesia botrana*).

Known processes for synthesizing conjugated diene compounds include a process for preparing (9Z,11E)-9,11-hexadecadienal with a total of eight steps including a key reaction of constructing a conjugated diene skeleton by blowing acetylene into an aqueous solution of acetic acid prepared from a halide and acrolein in the presence of a palladium catalyst (Non-Patent Literature 1 below); and a process for preparing (9E,11Z)-9,11-hexadecadienal with a total of five steps including constructing a conjugated enyne skeleton by subjecting 1-hexyne and 1,2-dichloroethylene to a coupling reaction in the presence of palladium and copper catalysts, and then reducing the alkyne of the conjugated enyne skeleton to construct a conjugated diene skeleton (Non-Patent Literature 2 below).

PRIOR ART

[Non-Patent Literatures]

[Non-Patent Literature 1] Yunhai Tao et al., Synthetic Communications, 2013, 43, 415-423.

[Non-Patent Literature 2] Marvin K. Harris et al., J. Econ. Entomol., 2008, 101(3), 769-776.

OBJECT OF THE INVENTION

However, the preparation processes of Non-Patent Literatures 1 and 2 each include five or more steps having low calculated total yields of no more than about 22%, and are industrially impractical. Measures to reduce steps and/or improve the yield may be considered for such preparation processes. The present inventors considered that if fewer steps can be used, even a medium-level yield may enable efficient production, resulting in an industrially practical preparation process. The present invention aims to provide a process for industrially preparing a conjugated diene compound efficiently and with few steps.

SUMMARY OF THE INVENTION

As a result of intensive research to overcome the aforesaid problems of the prior art, the present inventors found that Z-E and E-Z conjugated diene compounds can be subjected to intramolecular sigmatropic rearrangement reactions to prepare, with geometrical selectivity and in one step, novel conjugated diene compounds having different double bond positions, and thus have completed the present invention.

According to an aspect of the present invention, there is provided a process for preparing a conjugated diene compound, the process comprising:

subjecting, to an intramolecular sigmatropic rearrangement reaction, a conjugated diene compound (1) of the following general formula (1):

(1)

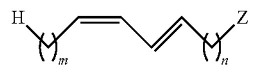

wherein Z represents a halogen atom, a methyl group, a hydroxy group, an acetoxy group, a formyl group, or an acetal, and n and m are, independently of each other, integers of 0 to 14, or a conjugated diene compound (2) of the following general formula (2):

(2)

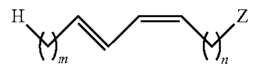

wherein Z, n, and m are as defined above, to obtain, respectively, a conjugated diene compound (3) of the following general formula (3):

(3)

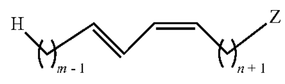

wherein Z is as defined above, and n and m are, independently of each other, integers of 0 to 14, with the proviso that m−1 is an integer of zero or more, or a conjugated diene compound (4) of the following general formula (4):

(4)

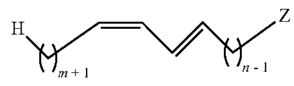

wherein Z is as defined above, and n and m are, independently of each other, integers of 0 to 14, with the proviso that n−1 is an integer of zero or more.

According to the present invention, novel conjugated diene compounds can be efficiently and industrially prepared from conjugated diene compounds in one step by utilizing an intramolecular sigmatropic rearrangement reaction. The target conjugated diene compounds can be prepared more effectively, particularly when the conjugated diene compounds of the starting materials are commercially available at low cost and/or in large quantities. Also, fewer steps result in less waste produced by each step, which is advantageous in view of green chemistry.

DETAILED DESCRIPTION OF THE INVENTION

A. Conjugated Diene Compounds as Starting Materials of the Following General Formulas (1) and (2)

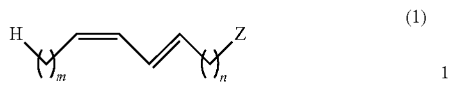

(1)

wherein Z represents a halogen atom, a methyl group ($CH_3$), a hydroxy group (OH), an acetoxy group ($OCOCH_3$), a formyl group (CHO), or an acetal, and n and m are, independently of each other, integers of 0 to 14.

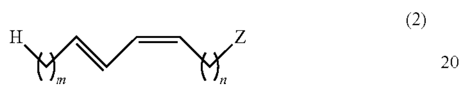

(2)

wherein Z, n, and m are respectively the same as Z, n, and m as defined in the general formula (1).

Specifically, examples of the halogen atom Z include a chlorine atom, a bromine atom, and an iodine atom. A chlorine atom and a bromine atom are preferred, and a chlorine atom is particularly preferred in view of availability.

When an acetal, Z represents $CH(OR^1)(OR^2)$, wherein $R^1$ and $R^2$ represent, independently of each other, a monovalent hydrocarbon group having 1 to 15 carbon atoms, preferably 1 to 10 carbon atoms, and more preferably 1 to 5 carbon atoms, or $R^1$ and $R^2$ are bonded to each other to form a divalent hydrocarbon group, $R^1$-$R^2$, having 2 to 10 carbon atoms, and preferably 2 to 5 carbon atoms.

Examples of the monovalent hydrocarbon group having 1 to 15 carbon atoms include linear saturated hydrocarbon groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, and an n-dodecyl group; branched saturated hydrocarbon groups such as an isopropyl group, a 2-methylpropyl group, and a 2-methylbutyl group; linear unsaturated hydrocarbon groups such as a 2-propenyl group; branched unsaturated hydrocarbon groups such as a 2-methyl-2-propenyl group; cyclic saturated hydrocarbon groups such as a cyclopropyl group; and isomers thereof. A part of the hydrogen atoms in the hydrocarbon groups may be substituted with a methyl group or an ethyl group.

The monovalent hydrocarbon group is preferably a methyl group, an ethyl group, an n-propyl group, and an n-butyl group in view of handling.

When $R^1$ and $R^2$ are bonded to each other to form a divalent hydrocarbon group, $R^1$-$R^2$, having 2 to 10 carbon atoms, examples include linear saturated hydrocarbon groups such as an ethylene group, a 1,3-propylene group, and a 1,4-butylene group; branched saturated hydrocarbon groups such as a 1,2-propylene group, a 2,2-dimethyl-1,3-propylene group, a 1,2-butylene group, a 1,3-butylene group, a 2,3-butylene group, and a 2,3-dimethyl-2,3-butylene group; linear unsaturated hydrocarbon groups such as a 1-vinylethylene group; branched unsaturated hydrocarbon groups such as a 2-methylene-1,3-propylene group; cyclic hydrocarbon groups such as a 1,2-cyclopropylene group and a 1,2-cyclobutylene group; and isomers thereof. A part of the hydrogen atoms in the hydrocarbon groups may be substituted with a methyl group or an ethyl group.

The divalent hydrocarbon group is preferably a lower hydrocarbon group preferably having 2 to 4 carbon atoms with high reactivity and/or deprotection by-products that are easily removable by washing or concentration in view of the reactivity of the deprotection, ease of purification, and/or availability.

Accordingly, particularly preferred examples of the divalent hydrocarbon group include an ethylene group, a 1,2-propylene group, a 1,3-propylene group, a 1,2-butylene group, a 1,3-butylene group, and a 2,3-dimethyl-2,3-butylene group in view of the aforesaid considerations.

Specific examples of the conjugated diene compounds (1) and (2) used as starting materials include the following compounds:

1-haloalkadiene compounds (Z=halogen atom) such as 1-chloro-3,5-hexadiene, 1-bromo-3,5-hexadiene, 1-iodo-3,5-hexadiene, and regioisomers thereof, 1-chloro-4,6-heptadiene, 1-bromo-4,6-heptadiene, 1-iodo-4,6-heptadiene, and regioisomers thereof, 1-chloro-5,7-octadienene, 1-bromo-5,7-octadienene, 1-iodo-5,7-octadienene, and regioisomers thereof, 1-chloro-6,8-nonadiene, 1-bromo-6,8-nonadiene, 1-iodo-6,8-nonadiene, and regioisomers thereof, 1-chloro-7,9-decadiene, 1-bromo-7,9-decadiene, 1-iodo-7,9-decadiene, and regioisomers thereof, 1-chloro-7,9-undecadiene, 1-bromo-7,9-undecadiene, 1-iodo-7,9-undecadiene, and regioisomers thereof, 1-chloro-7,9-dodecadiene, 1-bromo-7,9-dodecadiene, 1-iodo-7,9-dodecadiene, and regioisomers thereof, 1-chloro-8,10-tridecadiene, 1-bromo-8,10-tridecadiene, 1-iodo-8,10-tridecadiene, and regioisomers thereof, 1-chloro-9,11-tetradecadiene, 1-bromo-9,11-tetradecadiene, 1-iodo-9,11-tetradecadiene, and regioisomers thereof, 1-chloro-9,11-pentadecadiene, 1-bromo-9,11-pentadecadiene, 1-iodo-9,11-pentadecadiene, and regioisomers thereof, 1-chloro-9,11-hexadecadiene, 1-bromo-9,11-hexadecadiene, 1-iodo-9,11-hexadecadiene, and regioisomers thereof, 1-chloro-9,11-heptadecadiene, 1-bromo-9,11-heptadecadiene, 1-iodo-9,11-heptadecadiene, and regioisomers thereof, and 1-chloro-9,11-octadecadiene, 1-bromo-9,11-octadecadiene, 1-iodo-9,11-octadecadiene, and regioisomers thereof;

alkadiene compounds (Z=methyl group) such as 3,5-hexadiene and regioisomers thereof, 4,6-heptadiene and regioisomers thereof, 5,7-octadienene and regioisomers thereof, 6,8-nonadiene and regioisomers thereof, 7,9-decadiene and regioisomers thereof, 7,9-undecadiene and regioisomers thereof, 7,9-dodecadiene and regioisomers thereof, 8,10-tridecadiene and regioisomers thereof, 9,11-tetradecadiene and regioisomers thereof, 9,11-pentadecadiene and regioisomers thereof, 9,11-hexadecadiene and regioisomers thereof, 9,11-heptadecadiene and regioisomers thereof, and 9,11-octadecadiene and regioisomers thereof;

alkadienol compounds (Z=hydroxy group) such as 3,5-hexadienol and regioisomers thereof, 4,6-heptadienol and regioisomers thereof, 5,7-octadienol and regioisomers thereof, 6,8-nonadienol and regioisomers thereof, 7,9-decadienol and regioisomers thereof, 7,9-undecadienol and regioisomers thereof, 7,9-dodecadienol and regioisomers thereof, 8,10-tridecadienol and regioisomers thereof, 9,11-tetradecadienol and regioisomers thereof, 9,11-pentadecadienol and regioisomers thereof, 9,11-hexadecadienol and regioisomers thereof, 9,11-heptadecadienol and regioisomers thereof, and 9,11-octadecadienol and regioisomers thereof; alkadienyl acetate compounds (Z=acetoxy group) such as 3,5-hexadienyl acetate and regioisomers thereof, 4,6-heptadienyl acetate and regioisomers thereof, 5,7-octadienyl acetate and regioisomers thereof, 6,8-nonadienyl acetate and regioisomers thereof, 7,9-decadienyl acetate and regioisomers thereof, 7,9-undecadienyl acetate and regioisomers thereof, 7,9-dodecadienyl acetate and regioisomers thereof, 8,10-tridecadienyl acetate and regioisomers thereof, 9,11-tetradecadienyl acetate and regioisomers thereof, 9,11-pentadecadienyl acetate and regioisomers thereof, 9,11-hexadecadienyl acetate and regioisomers thereof, 9,11-heptadecadienyl acetate and regioisomers thereof, and 9,11-octadecadienyl acetate and regioisomers thereof;

alkadienal compounds (Z=formyl group) such as 3,5-hexadienal and regioisomers thereof, 4,6-heptadienal and regioisomers thereof, 5,7-octadienal and regioisomers thereof, 6,8-nonadienal and regioisomers thereof, 7,9-decadienal and regioisomers thereof, 7,9-undecadienal and regioisomers thereof, 9,11-dodecadienal and regioisomers thereof, 8,10-tridecadienal and regioisomers thereof, 9,11-tetradecadienal and regioisomers thereof, 9,11-pentadecadienal and regioisomers thereof, 9,11-hexadecadienal and regioisomers thereof, 9,11-heptadecadienal and regioisomers thereof, and 9,11-octadecadienal and regioisomers thereof; and dialkoxyalkadienyne compounds (Z=acetal) such as 1,1-dimethoxy-3,5-hexadiene, 1,1-diethoxy-3,5-hexadiene, and regioisomers thereof, 1,1-dimethoxy-4,6-heptadiene, 1,1-diethoxy-4,6-heptadiene, and regioisomers thereof, 1,1-dimethoxy-5,7-octadienene, 1,1-diethoxy-5,7-octadienene, and regioisomers thereof, 1,1-dimethoxy-6,8-nonadiene, 1,1-diethoxy-6,8-nonadiene, and regioisomers thereof, 1,1-dimethoxy-7,9-decadiene, 1,1-diethoxy-7,9-decadiene, and regioisomers thereof, 1,1-dimethoxy-7,9-undecadiene, 1,1-diethoxy-7,9-undecadiene, and regioisomers thereof, 1,1-dimethoxy-9,11-dodecadiene, 1,1-diethoxy-7,9-dodecadiene, and regioisomers thereof, 1,1-dimethoxy-8,10-tridecadiene, 1,1-diethoxy-8,10-tridecadiene, and regioisomers thereof, 1,1-dimethoxy-9,11-tetradecadiene, 1,1-diethoxy-9,11-tetradecadiene, and regioisomers thereof, 1,1-dimethoxy-9,11-pentadecadiene, 1,1-diethoxy-9,11-pentadecadiene, and regioisomers thereof, 1,1-dimethoxy-9,11-hexadecadiene, 1,1-diethoxy-9,11-hexadecadiene, and regioisomers thereof, 1,1-dimethoxy-9,11-heptadecadiene, 1,1-diethoxy-9,11-heptadecadiene, and regioisomers thereof, and 1,1-dimethoxy-9,11-octadecadiene, 1,1-diethoxy-9,11-octadecadiene, and regioisomers thereof.

The conjugated diene compounds (1) and (2) can be prepared according to, for example, the following chemical reaction formulas, respectively. In the following chemical reaction formulas, the wavy lines indicate that the structures therebeyond are abbreviated.

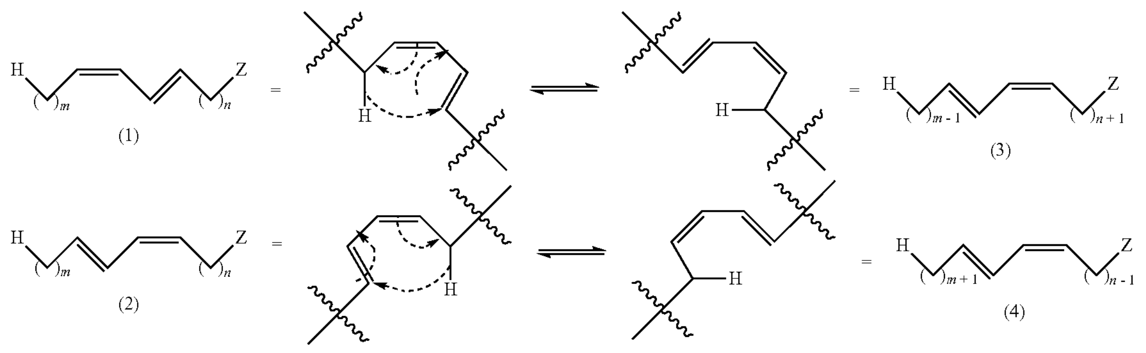

The novel conjugated diene compound (3) of the formula above can be prepared with geometrical selectivity by heating the starting material, the conjugated diene compound (1), to cause intramolecular sigmatropic rearrangement to proceed.

Similarly, the novel conjugated diene compound (4) of the formula above can be prepared with geometrical selectivity by heating the starting material, the conjugated diene compound (2), to cause intramolecular sigmatropic rearrangement to proceed. At this time, the diene structure parts of the conjugated diene compounds (1) and (2) used as the starting materials rearrange with geometrical selectivity toward the Z-olefin side as shown in the chemical reaction formulas above.

A solvent may be used in the intramolecular sigmatropic rearrangement reaction, if necessary. Examples of the solvent include general solvents such as, for example, ether solvents such as tetrahydrofuran (THF), 2-methyltetrahydrofuran (2-MeTHF), diethyl ether, dibutyl ether, 4-methyltetrahydropyran (MTHP), cyclopentylmethylether, and 1,4-dioxane; hydrocarbon solvents such as hexane, heptane, benzene, toluene, xylene, decalin, and cumene; and polar solvents such as N,N-dimethylformamide (DMF), N,N-dimethylacetamide (DMAC), N-methylpyrrolidone (NMP), dimethyl sulfoxide (DMSO), γ-butyrolactone (GBL), acetonitrile, N,N'-dimethylpropylene urea (DMPU), hexamethylphosphoric triamide (HMPA), dichloromethane, and chloroform. Hydrocarbon solvents such as toluene, xylene, and decalin; ether solvents such as tetrahydrofuran, 2-methyltetrahydrofuran, 4-methyltetrahydropyran, and diethyl ether; and polar solvents such as N,N-dimethylacetamide (DMAC), N-methylpyrrolidone, and γ-butyrolactone are preferred in view of the reactivity.

The solvent may be used alone or in combination thereof, if necessary. The solvent may be a commercially available one.

The amount of the solvent used is preferably 0 to 8,000 g, and more preferably 0 to 5,000 g, per mol of the conjugated diene compound (1) or (2) in view of the reactivity.

The reaction temperature of the intramolecular sigmatropic rearrangement reaction varies, depending on the conjugated diene compound (1) or (2) to be used, and is preferably 10 to 500° C., more preferably 60 to 300° C., and even more preferably 60 to 230° C. in view of the reactivity.

The reaction time of the intramolecular sigmatropic rearrangement reaction varies, depending on the production scale and/or the reaction temperature to be used, and is preferably 0.5 to 100 hours in view of the reactivity.

Thus, the novel conjugated diene compounds (3) and (4) can be efficiently prepared respectively from the conjugated diene compounds (1) and (2) in one step.

Thus, novel conjugated diene compounds can be prepared by subjecting compounds having conjugated diene skeletons to efficient intramolecular sigmatropic rearrangement reactions. In other words, this means that conjugated diene compounds having conjugated diene skeletons must be handled with care to avoid purity degradation due to intramolecular sigmatropic rearrangement reactions under certain conditions, except when intentionally preparing target compounds by intramolecular sigmatropic rearrangement reactions as in the present invention. On the other hand, monoene compounds and diene compounds having unconjugated diene skeletons do not require such care because intramolecular sigmatropic rearrangement reactions do not proceed in monoene compounds or diene compounds having unconjugated diene skeletons.

However, depending on the type of the conjugated diene compound, it cannot be inferred by analogy how the reaction will proceed. The ease of progress of the intramolecular sigmatropic rearrangement reaction is considered to depend on, for example, the type of conjugated diene compound used as the starting material such as the position of the conjugated diene in the compound, common functional groups, the chain length range, common configurations, or combinations thereof, and so the reactivity and/or yield must be experimentally confirmed for different compound groups. Conjugated diene compounds that have low activation energies, for example, easily undergo intramolecular sigmatropic rearrangement reactions, and require handling methods and/or reaction conditions that avoid heating or control the heating temperature and/or heating time. Sigmatropic rearrangement of conjugated diene skeletons also may proceed when distilled under high-temperature conditions, and so the distillation conditions and/or the purification method must be carefully considered.

An intramolecular sigmatropic rearrangement reaction may proceed in, for example, (1) a halogenation reaction of an alkadienol compound having a conjugated diene skeleton, (2) preparation of a Grignard reagent of a 1-haloalkadiene compound having a conjugated diene skeleton, (3) a reaction using the Grignard reagent of (2), (4) an acetoxylation reaction of a 1-haloalkadiene compound having a conjugated diene skeleton, and (5) a hydrolysis reaction of a dialkoxyalkadienyne compound having a conjugated diene skeleton. It is estimated that intramolecular sigmatropic rearrangement reactions may proceed particularly in reactions under heated conditions.

It is estimated that intramolecular sigmatropic rearrangement may proceed according to, for example, the following reaction formulas when using the following compounds having conjugated diene skeletons.

(1) Halogenation Reaction of Alkadienol Compound Having Conjugated Diene Skeleton 1) Examples of alkadienol compounds include 7,9-decadienol and regioisomers thereof, 7,9-undecadienol and regioisomers thereof, 7,9-dodecadienol and regioisomers thereof, 7,9-tridecadienol and regioisomers thereof, 4,6-tetradecadienol and regioisomers thereof, 7,9-pentadecadienol and regioisomers thereof, 7,9-hexadecadienol and regioisomers thereof, 7,9-heptadecadienol and regioisomers thereof, and 7,9-octadecadienol and regioisomers thereof.

2) Specific chemical reaction formulas of the halogenation reaction may be as follows.

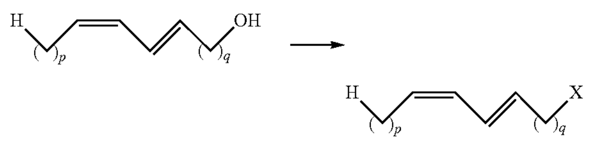

wherein X represents a halogen atom, and p and q are integers of 0 to 14.

(2) Grignard Reagent Preparation of 1-Haloalkadiene Compound Having Conjugated Diene Skeleton 1) Examples of 1-haloalkadiene compounds include 1-chloro-3,5-decadiene, 1-bromo-3,5-decadiene, 1-iodo-3,5-decadiene, and regioisomers thereof, 1-chloro-3,5-undecadiene, 1-bromo-3,5-undecadiene, 1-iodo-3,5-undecadiene, and regioisomers thereof, 1-chloro-3,5-dodecadiene, 1-bromo-3,5-dodecadiene, 1-iodo-3,5-dodecadiene, and regioisomers thereof, 1-chloro-3,5-tridecadiene, 1-bromo-3,5-tridecadiene, 1-iodo-3,5-tridecadiene, and regioisomers thereof, 1-chloro-3,5-tetradecadiene, 1-bromo-3,5-tetradecadiene, 1-iodo-3,5-tetradecadiene, and regioisomers thereof, 1-chloro-3,5-pentadecadiene, 1-bromo-3,5-pentadecadiene, 1-iodo-3,5-pentadecadiene, and regioisomers thereof, 1-chloro-3,5-hexadecadiene, 1-bromo-3,5-hexadecadiene, 1-iodo-3,5-hexadecadiene, and regioisomers thereof, 1-chloro-3,5-heptadecadiene, 1-bromo-3,5-heptadecadiene, 1-iodo-3,5-heptadecadiene, and regioisomers thereof, and 1-chloro-3,5-octadecadiene, 1-bromo-3,5-octadecadiene, 1-iodo-3,5-octadecadiene, and regioisomers thereof.

2) Specific chemical reaction formulas of the Grignard reagent preparation may be as follows.

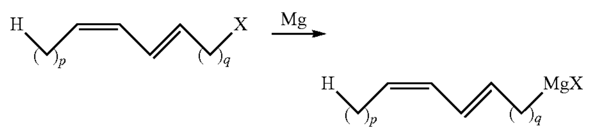

wherein X represents a halogen atom, and p and q are integers of 0 to 14.

(3) Reaction Using Grignard Reagent of (2)

Specific chemical reaction formulas of such reactions may be as follows.

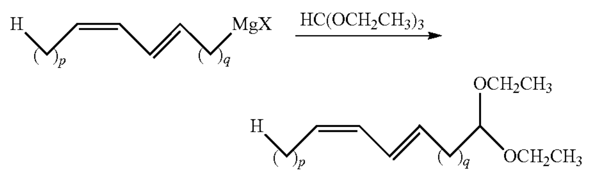

wherein X represents a halogen atom, and p and q are integers of 0 to 14.

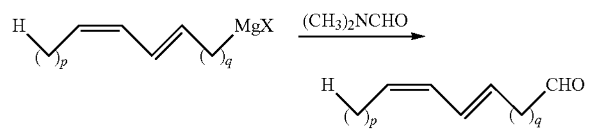

wherein X represents a halogen atom, and p and q are integers of 0 to 14.

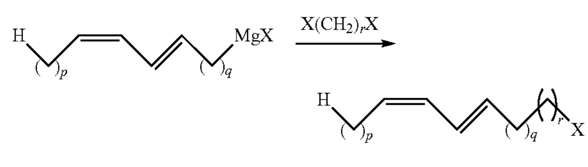

wherein X represents a halogen atom, p and q are integers of 0 to 14, and r is an integer of 1 to 10.

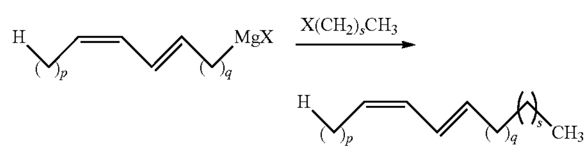

wherein X represents a halogen atom, p and q are integers of 0 to 14, and s is an integer of 1 to 30.

(4) Acetoxylation Reaction of 1-Haloalkadiene Compound Having Conjugated Diene Skeleton 1) The 1-haloalkadiene compounds are as in (2) above.

2) Specific chemical reaction formulas of the acetoxylation described above may be as follows.

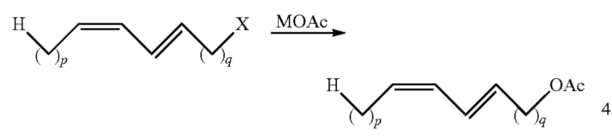

wherein X represents a halogen atom, p and q are integers of 0 to 14, M represents lithium, sodium, potassium, magnesium, or calcium, and Ac represents an acetyl group.

(5) Hydrolysis Reaction of Dialkoxyalkadienyne Compound Having Conjugated Diene Skeleton 1) Examples of dialkoxyalkadienyne compounds include 10,10-dimethoxy-3,5-decadiene, 10,10-diethoxy-3,5-decadiene, 10,10-dipropyloxy-3,5-decadiene, 10,10-dibutoxy-3,5-decadiene, and regioisomers thereof, 11,11-dimethoxy-3,5-undecadiene, 11,11-diethoxy-3,5-undecadiene, 11,11-dipropyloxy-3,5-undecadiene, 11,11-dibutoxy-3,5-undecadiene, and regioisomers thereof, 12,12-dimethoxy-3,5-dodecadiene, 12,12-diethoxy-3,5-dodecadiene, 12,12-dipropyloxy-3,5-dodecadiene, 12,12-dibutoxy-3,5-dodecadiene, and regioisomers thereof, 13,13-dimethoxy-3,5-tridecadiene, 13,13-diethoxy-3,5-tridecadiene, 13,13-dipropyloxy-3,5-tridecadiene, 13,13-dibutoxy-3,5-tridecadiene, and regioisomers thereof, 14,14-dimethoxy-3,5-tetradecadiene, 14,14-diethoxy-3,5-tetradecadiene, 14,14-dipropyloxy-3,5-tetradecadiene, 14,14-dibutoxy-3,5-tetradecadiene, and regioisomers thereof, 15,15-dimethoxy-3,5-pentadecadiene, 15,15-diethoxy-3,5-pentadecadiene, 15,15-dipropyloxy-3,5-pentadecadiene, 15,15-dibutoxy-3,5-pentadecadiene, and regioisomers thereof, 16,16-dimethoxy-3,5-hexadecadiene, 16,16-diethoxy-3,5-hexadecadiene, 16,16-dipropyloxy-3,5-hexadecadiene, 16,16-dibutoxy-3,5-hexadecadiene, and regioisomers thereof, 17,17-dimethoxy-3,5-heptadecadiene, 17,17-diethoxy-3,5-heptadecadiene, 17,17-dipropyloxy-3,5-heptadecadiene, 17,17-dibutoxy-3,5-heptadecadiene, and regioisomers thereof, and 18,18-dimethoxy-3,5-octadecadiene, 18,18-diethoxy-3,5-octadecadiene, 18,18-dipropyloxy-3,5-octadecadiene, 18,18-dibutoxy-3,5-octadecadiene, and regioisomers thereof.

2) Specific chemical reaction formulas of the hydrolysis reactions may be as follows.

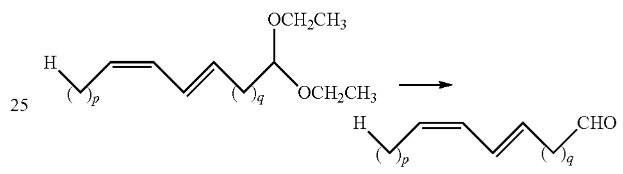

wherein p and q are integers of 0 to 14.

EXAMPLES

The present invention will be described with reference to the following Examples. It should be noted that the present invention is not limited to or by the Examples.

The term "purity" as used herein means an area percentage in gas chromatography (GC), unless otherwise specified. The term "product ratio" means a ratio of area percentages in GC. The term "yield" is calculated from the area percentages determined by GC.

In the Examples, monitoring of the reactions and calculation of the yields were carried out in the following GC conditions.

GC conditions: GC: Capillary gas chromatograph GC-2014 (Shimadzu Corporation); column: DB-WAX, 0.25 μm×0.25 mmϕ×30 m; carrier gas: He (1.55 mL/min), detector: FID; column temperature: 150° C., elevated at a rate of 5° C./min up to 230° C.

The yield was calculated according to the following equation in consideration of purities (% GC) of a starting material and a product.

Yield (%)={[(weight of a product obtained by a reaction×% GC)/molecular weight of a product]÷[(weight of a starting material in a reaction×% GC)/molecular weight of a starting material]}×100

In the following Examples, Et represents an ethyl group, and Ac represents an acetyl group ($—OCOCH_3$).

The starting material, (7E,9Z)-7,9-dodecadienyl acetate (1: m=2, n=6, Z=OAc) (10.00 g, 0.042 mol, purity 94.09%), used in Examples 1 to 4 included 2.59% of its geometric isomer, (7E,9E)-7,9-dodecadienyl acetate (1: m=2, n=6, Z=OAc).

Example 1: Preparation of (8Z,10E)-8,10-dodecadienyl acetate (3: m=2, n=6, Z=OAc)

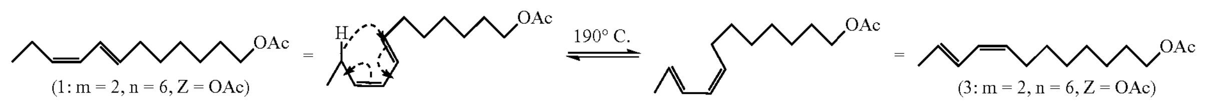 [SMILES: CC/C=C\C=C\CCCCCCOC(C)=O ; CC/C=C\C=C\CCCCCCOC(C)=O ; C/C=C/C=C\CCCCCCCOC(C)=O ; C/C=C/C=C\CCCCCCCOC(C)=O]

(1: m = 2, n = 6, Z = OAc)

(3: m = 2, n = 6, Z = OAc)

(7E,9Z)-7,9-Dodecadienyl acetate (1: m=2, n=6, Z=OAc) (10.00 g, 0.042 mol, purity 94.09%) was placed in a reactor and stirred for 10 hours at 190° C. The obtained reaction mixture was cooled to 15 to 25° C. and then subjected to distillation at a reduced pressure to obtain 8.87 g of a mixture of a reaction product, (8Z,10E)-8,10-dodecadienyl acetate (3: m=2, n=6, Z=OAc), and the starting material, (7E,9Z)-7,9-dodecadienyl acetate (1: m=2, n=6, Z=OAc). In other words, (8Z,10E)-8,10-dodecadienyl acetate (3: m=2, n=6, Z=OAc) (8.87 g (as the mixture thereof), 0.012 mol, purity 30.14%, b.p.=118.8 to 122.8° C./0.69 kPa (5.2 mmHg)) with a yield of 28.42% and (7E,9Z)-7,9-dodecadienyl acetate (1: m=2, n=6, Z=OAc) (8.87 g (as the mixture thereof), 0.025 mol, purity 62.77%, b.p.=118.8 to 122.8° C./0.69 kPa (5.2 mmHg)) with a yield of 59.17% were obtained as the mixture.

The following is the spectrum data of (8Z,10E)-8,10-dodecadienyl acetate (3: m=2, n=6, Z=OAc) thus prepared. The spectrum data below was determined based on the measurement of the spectrum data of the mixture by considering the spectrum data of the starting material.

Nuclear magnetic resonance spectrum: $^{1}$H-NMR (500 MHz, $CDCl_3$): δ=1.29-1.44 (8H, m), 1.58-1.65 (2H, m), 1.77 (3H, J=6.6 Hz), 2.04 (3H, s), 2.15 (2H, dt, J=7.2 Hz, 7.2 Hz), 4.05 (2H, t, J=6.9 Hz), 5.25-5.33 (1H, m), 5.63-5.70 (1H, m), 5.94 (1H, dd, J=11.4 Hz, 11.4 Hz), 6.26-6.34 (1H, m); $^{13}$C-NMR (500 MHz, $CDCl_3$): δ=18.42, 21.14, 26.00, 27.74, 28.71, 29.23, 29.25, 29.76, 64.76, 127.14, 128.68, 129.19, 129.84.

Example 2

A reaction was performed under the same conditions as Example 1, with the proviso that the reaction temperature was changed to 200° C. The spectrum data of (8Z,10E)-8,10-dodecadienyl acetate (3: m=2, n=6, Z=OAc) obtained in the reaction of Example 2 was the same as that of Example 1.

Example 3

A reaction was performed under the same conditions as Example 1, with the proviso that the reaction temperature was changed to 210° C. The spectrum data of (8Z,10E)-8,10-dodecadienyl acetate (3: m=2, n=6, Z=OAc) obtained in the reaction of Example 3 was the same as that of Example 1.

Example 4

A reaction was performed under the same conditions as Example 1, with the proviso that the reaction temperature was changed to 230° C. The spectrum data of (8Z,10E)-8,10-dodecadienyl acetate (3: m=2, n=6, Z=OAc) obtained in the reaction of Example 4 was the same as that of Example 1.

Table 1 below shows the GC % partway through the reaction and the distillation yield after the reaction for Examples 1 to 4.

In Table 1, "E7Z9" represents (7E,9Z)-7,9-dodecadienyl acetate (1: m=2, n=6, Z=OAc), "E7E9" represents (7E,9E)-7,9-dodecadienyl acetate (1: m=2, n=6, Z=OAc), "Z8E10" represents (8Z,10E)-8,10-dodecadienyl acetate (3: m=2, n=6, Z=OAc), and "A" was estimated to be one of (8E,10E)-8,10-dodecadienyl acetate (3: m=2, n=6, Z=OAc) (hereinbelow, "E8E10"), (8Z,10E)-8,10-dodecadienyl acetate (3: m=2, n=6, Z=OAc) (hereinbelow, "Z8E10"), or (8E,10Z)-8,10-dodecadienyl acetate (3: m=2, n=6, Z=OAc) (hereinbelow, "E8Z10").

TABLE 1

| | Examples | | | | | | | | | | | | | | | |
|---|---|---|---|---|---|---|---|---|---|---|---|---|---|---|---|---|
| | Example 1 | | | | Example 2 | | | | Example 3 | | | | Example 4 | | | |
| | Reaction temp.[° C.] | | | | | | | | | | | | | | | |
| | 190 | | | | 200 | | | | 210 | | | | 230 | | | |
| Products | E7Z9 | E7E9 | Z8E10 | A | E7Z9 | E7E9 | Z8E10 | A | E7Z9 | E7E9 | Z8E10 | A | E7Z9 | E7E9 | Z8E10 | A |
| GC % at 0 hour | 94.09 | 2.59 | — | — | 94.09 | 2.59 | — | — | 94.09 | 2.59 | — | — | 94.09 | 2.59 | — | — |
| GC % at 2 hours | 84.11 | — | 13.09 | 0.32 | 75.33 | — | 21.30 | 0.64 | | | | | 45.25 | 2.34 | 46.48 | 3.22 |
| GC % at 4 hours | 78.12 | — | 18.77 | 0.51 | 65.98 | — | 29.81 | 1.03 | 53.96 | | 40.65 | 2.00 | 39.81 | 3.08 | 45.44 | 5.40 |
| GC % at 6 hours | 73.11 | — | 23.58 | 0.75 | 57.23 | — | 37.28 | 1.50 | 47.06 | 1.59 | 44.29 | 2.60 | 38.65 | 3.72 | 44.31 | 6.57 |
| GC % at 7 hours | | | | | | | | | | | | | | | | |
| GC % at 8 hours | 68.35 | — | 28.21 | 0.88 | 52.09 | 1.70 | 41.28 | 1.92 | 44.58 | 1.98 | 46.27 | 2.89 | 37.18 | 4.45 | 43.27 | 7.52 |
| GC % at 10 hours | 64.58 | — | 31.34 | 1.03 | 49.60 | 1.59 | 43.24 | 2.09 | 42.89 | 2.24 | 46.97 | 3.36 | 35.82 | 4.70 | 42.09 | 8.26 |
| Distillation yield [%] | 59.17 | — | 28.42 | 0.89 | 43.49 | 1.40 | 35.67 | 1.72 | 37.39 | 1.81 | 40.31 | 2.86 | 26.94 | 3.32 | 30.88 | 6.00 |

Mass spectrum: EI-mass spectrum (70 eV): m/z 224 ($M^+$), 164, 149, 135, 121, 107, 93, 79, 68, 55, 43, 29.

Infrared absorption spectrum: (D-ATR): νmax=3018, 2931, 2856, 1742, 1455, 1387, 1365, 1239, 1039, 983, 947, 727 $cm^{-1}$.

The table above shows that the distillation yield after a reaction time of 10 hours for Z8E10 improved as the temperature was increased from 190° C. to 200 and 210° C., but decreased for 230° C. The yield was good, however, even for 230° C. when the reaction time was short, for example, 2 to 6 hours. It is considered that the yield difference occurred because less time was needed to reach an equilibrium state for higher temperatures, and another reaction after equilibrium gradually proceeded as a transition to the next equilibrium state. Accordingly, yields similar to those of low temperatures can be maintained for high temperatures as long as the time to reach the equilibrium state can be determined.

Example 5: Preparation of (8Z,10E)-8,10-dodecadienyl acetate (3: m=2, n=6, Z=OAc)

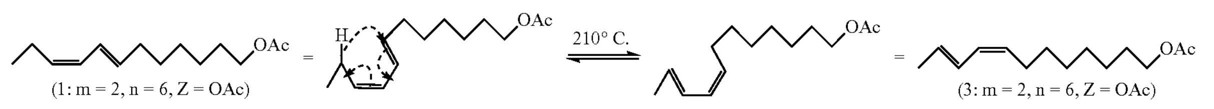 [SMILES: CC/C=C\C=C\CCCCCCOC(C)=O ; CC/C=C\C=C\CCCCCCOC(C)=O ; C/C=C/C=C\CCCCCCCOC(C)=O ; C/C=C/C=C\CCCCCCCOC(C)=O]

(1: m = 2, n = 6, Z = OAc)

(3: m = 2, n = 6, Z = OAc)

(7E,9Z)-7,9-Dodecadienyl acetate (1: m=2, n=6, Z=OAc) (20.00 g, 0.084 mol, purity 94.09%) was placed in a reactor and stirred for 10 hours at 210° C. The obtained reaction mixture was cooled to 15 to 25° C. and then subjected to distillation at a reduced pressure to obtain 17.92 g of a mixture of (8Z,10E)-8,10-dodecadienyl acetate (3: m=2, n=6, Z=OAc) and (7E,9Z)-7,9-dodecadienyl acetate (1: m=2, n=6, Z=OAc). In other words, (8Z,10E)-8,10-dodecadienyl acetate (3: m=2, n=6, Z=OAc) (17.92 g (as the mixture thereof), 0.037 mol, purity 46.30%, b.p.=118.8 to 122.8° C./0.69 kPa (5.2 mmHg)) with a yield of 44.09% and (7E,9Z)-7,9-dodecadienyl acetate (1: m=2, n=6, Z=OAc) (17.92 g (as the mixture thereof), 0.036 mol, purity 44.68%, b.p.=118.8 to 122.8° C./0.69 kPa (5.2 mmHg)) with a yield of 42.55% were obtained as the mixture. Thus, the attractant of *Cydia leucostoma*, (8Z,10E)-8,10-dodecadienyl acetate (3: m=2, n=6, Z=OAc), can be prepared simply and with geometrical selectivity from the sex pheromone of *Lobesia botrana*, (7E,9Z)-7,9-dodecadienyl acetate (1: m=2, n=6, Z=OAc), which is commercially available in large quantities.

The yields were different between Examples 3 and 5 despite having identical conditions except for the quantities of the starting material, (7E,9Z)-7,9-dodecadienyl acetate. It is considered that the loss due to adhesion to the distillation equipment and the loss due to sampling for monitoring the reaction in Example 3 combined with the smaller scale of Example 3 to result in a lower yield.

Example 6: Preparation of (2E,4Z)-12-chloro-3,5-dodecadiene (3: m=2, n=6, Z=Cl)

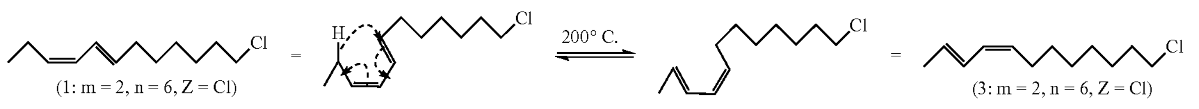

(1: m = 2, n = 6, Z = Cl)

(3: m = 2, n = 6, Z = Cl)

(3Z,5E)-12-Chloro-3,5-dodecadiene (1: m=2, n=6, Z=Cl) (5.00 g, 0.021 mol, purity 85.41%) was placed in a reactor and stirred for 10 hours at 200° C. The obtained reaction mixture was cooled to 15 to 25° C. and then subjected to distillation at a reduced pressure to obtain 3.95 g of a mixture of (2E,4Z)-12-chloro-3,5-dodecadiene (3: m=2, n=6, Z=Cl) and (3Z,5E)-12-chloro-3,5-dodecadiene (1: m=2, n=6, Z=Cl). In other words, (2E,4Z)-12-chloro-3,5-dodecadiene (3: m=2, n=6, Z=Cl) (3.95 g (as the mixture thereof), 0.0068 mol, purity 34.75%, b.p.=102.1 to 104.0° C./0.88 kPa (6.6 mmHg)) with a yield of 32.38% and (3Z,5E)-12-chloro-3,5-dodecadiene (1: m=2, n=6, Z=Cl) (3.95 g (as the mixture thereof), 0.010 mol, purity 51.13%, b.p.=102.1 to 104.0° C./0.88 kPa (6.6 mmHg)) with a yield of 47.91% were obtained as the mixture.

The following is the spectrum data of (2E,4Z)-12-chloro-3,5-dodecadiene (3: m=2, n=6, Z=Cl) thus prepared. The spectrum data below was determined based on the measurement of the spectrum data of the mixture by considering the spectrum data of the starting material.

Nuclear magnetic resonance spectrum: $^{1}$H-NMR (500 MHz, $CDCl_3$): δ=1.28-1.48 (10H, m), 1.78 (3H, J=6.9 Hz), 2.03-2.16 (2H, m), 3.53 (2H, t, J=6.9 Hz), 5.25-5.34 (1H, m), 5.61-5.72 (1H, m), 5.99 (1H, dd, J=10.7 Hz, 10.7 Hz), 6.26-6.36 (1H, m); $^{13}$C-NMR (500 MHz, $CDCl_3$): δ=18.26, 26.80, 27.56, 28.72, 29.00, 29.58, 32.59, 45.11, 126.97, 128.56, 129.05, 129.63.

Mass spectrum: EI-mass spectrum (70 eV): m/z 200 ($M^+$), 158, 95, 82, 68, 54, 41.

Infrared absorption spectrum: (D-ATR): νmax=2960, 2931, 2856, 1462, 1307, 983, 947, 728, 653 $cm^{-1}$.

Example 7: Preparation of (4E,6Z)-1,1-diethoxy-4,6-dodecadiene (4: m=4, n=3, Z=$CH(OEt)_2$)

Nuclear magnetic resonance spectrum: $^1$H-NMR (500 MHz, $CDCl_3$): δ=0.88 (3H, t, J=7.3 Hz), 1.20 (6H, t, J=6.9 Hz), 1.26-1.48 (4H, m), 1.58-1.66 (2H, m), 1.72 (2H, dt, J=5.8 Hz, 7.7 Hz), 2.02-2.22 (4H, m), 3.44-3.53 (2H, m), 3.58-3.68 (2H, m), 4.49 (1H, t, J=5.8 Hz), 5.24-5.34 (1H, m), 5.60-5.70 (1H, m), 5.93 (1H, dd, J=10.7 Hz, 10.7 Hz), 6.24-6.36 (1H, m); $^{13}$C-NMR (500 MHz, $CDCl_3$): δ=13.91, 14.03, 22.53, 27.64, 28.07, 29.38, 31.45, 33.12, 61.00, 102.36, 126.03, 128.35, 130.50, 133.26.

Mass spectrum: EI-mass spectrum (70 eV): m/z 254 ($M^+$), 208, 165, 136, 103, 79, 55, 29.

Infrared absorption spectrum: (D-ATR): νmax=2974, 2957, 2928, 2873, 1457, 1444, 1374, 1344, 1129, 1064, 984, 948, 732 $cm^{-1}$.

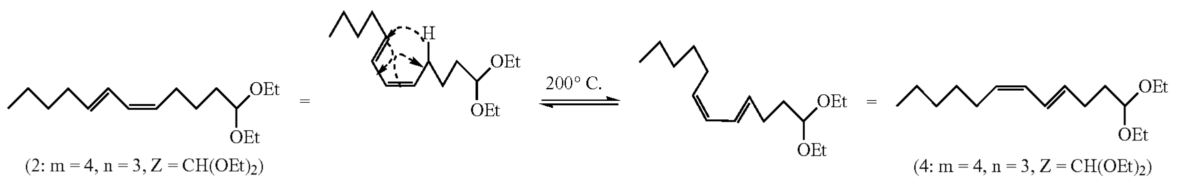 [SMILES: CCCC/C=C/C=C\CCCC(OCC)OCC ; CCCC/C=C/C=C\CCCC(OCC)OCC ; CCCCC/C=C\C=C\CCC(OCC)OCC ; CCCCC/C=C\C=C\CCC(OCC)OCC]

(2: m = 4, n = 3, Z = $CH(OEt)_2$)

(4: m = 4, n = 3, Z = $CH(OEt)_2$)

(5Z,7E)-1,1-Diethoxy-5,7-dodecadiene (2: m=4, n=3, Z=$CH(OEt)_2$) (5.00 g, 0.015 mol, purity 76.53%) was placed in a reactor and stirred for 10 hours at 200° C. The obtained reaction mixture was cooled to 15 to 25° C. and then subjected to distillation at a reduced pressure to obtain 4.14 g of a mixture of (4E,6Z)-1,1-diethoxy-4,6-dodecadiene (4: m=4, n=3, Z=$CH(OEt)_2$) and (5Z,7E)-1,1-diethoxy-5,7-dodecadiene (2: m=4, n=3, Z=$CH(OEt)_2$). In other words, (4E,6Z)-1,1-diethoxy-4,6-dodecadiene (4: m=4, n=3, Z=$CH(OEt)_2$) (4.14 g (as the mixture thereof), 0.0049 mol, purity 30.05%, b.p.=100.0 to 107.1° C./0.04 kPa (0.32 mmHg)) with a yield of 32.67% and (5Z,7E)-1,1-diethoxy-5,7-dodecadiene (2: m=4, n=3, Z=$CH(OEt)_2$) (4.14 g (as the mixture thereof), 0.0074 mol, purity 45.73%, b.p.=100.0 to 107.1° C./0.04 kPa (0.32 mmHg)) with a yield of 49.33% were obtained as the mixture.

The following is the spectrum data of the starting material, (5Z,7E)-1,1-diethoxy-5,7-dodecadiene (9: R=Et), thus prepared.

Nuclear magnetic resonance spectrum: $^1$H-NMR (500 MHz, $CDCl_3$): δ=0.89 (3H, t, J=6.9 Hz), 1.20 (6H, t, J=6.9 Hz), 1.27-1.41 (4H, m), 1.41-1.49 (2H, m), 1.63 (2H, dt, J=9.9 Hz, 5.8 Hz), 2.09 (2H, q-like, J=6.9 Hz), 2.18 (2H, q-like, 7.5 Hz), 3.45-3.52 (2H, m), 3.59-3.67 (2H, m), 4.48 (1H, t, J=5.7 Hz), 5.28 (1H, dt, J=10.7 Hz, 7.7 Hz), 5.65 (1H, dt, J=7.3 Hz, 7.3 Hz), 5.95 (1H, dd, J=11.1 Hz, 11.1 Hz), 6.28 (1H, dddt, J=15.0 Hz, 11.1 Hz, 1.5 Hz, 1.5 Hz); $^{13}$C-NMR (500 MHz, $CDCl_3$): δ=13.90, 15.31, 22.24, 24.84, 27.38, 31.51, 32.52, 33.09, 60.82, 102.77, 125.48, 129.01, 129.32, 134.89.

Mass spectrum: EI-mass spectrum (70 eV): m/z 254 ($M^+$), 208, 165, 136, 103, 79, 57, 29.

Infrared absorption spectrum: (D-ATR): ν=2956, 2928, 2873, 1457, 1444, 1374, 1343, 1129, 1064, 984, 94.

The following is the spectrum data of (4E,6Z)-1,1-diethoxy-4,6-dodecadiene (4: m=4, n=3, Z=$CH(OEt)_2$) thus prepared. The spectrum data below was determined based on the measurement of the spectrum data of the mixture by considering the spectrum data of the starting material.

The invention claimed is:

1. A process for preparing a conjugated diene compound, the process comprising:

subjecting, to an intramolecular sigmatropic rearrangement reaction, a conjugated diene compound (1) of the following general formula (1):

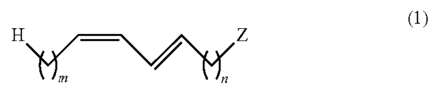

(1)

wherein Z represents a halogen atom, a hydroxy group, an acetoxy group, a formyl group, or an acetal, and n and m are, independently of each other, integers of 0 to 14, or a conjugated diene compound (2) of the following general formula (2):

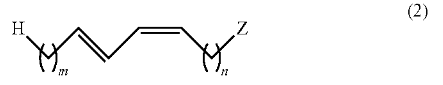

(2)

wherein Z, n, and m are as defined above, to obtain, respectively, a conjugated diene compound (3) of the following general formula (3):

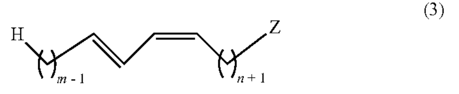

(3)

wherein Z is as defined above, and n and m are, independently of each other, integers of 0 to 14, with the proviso that m-1 is an integer of zero or more, or a conjugated diene compound (4) of the following general formula (4):

(4)

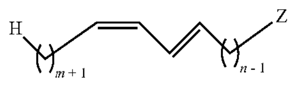

wherein Z is as defined above, and n and m are, independently of each other, integers of 0 to 14, with the proviso that n-1 is an integer of zero or more.

2. The process for preparing the conjugated diene compound according to claim 1, the process comprising subjecting a conjugated diene compound (1) of the following general formula (1):

(1)

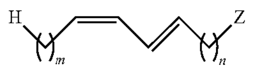

wherein Z represents a halogen atom, a hydroxy group, an acetoxy group, a formyl group, or an acetal, and n and m are, independently of each other, integers of 0 to 14, to an intramolecular sigmatropic rearrangement reaction to obtain a conjugated diene compound (3) of the following general formula (3):

(3)

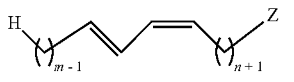

wherein Z is as defined above, and n and m are, independently of each other, integers of 0 to 14, with the proviso that m-1 is an integer of zero or more.

3. The process for preparing the conjugated diene compound according to claim 1, the process comprising subjecting a conjugated diene compound (2) of the following general formula (2):

(2)

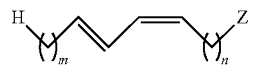

wherein Z represents a halogen atom, a hydroxy group, an acetoxy group, a formyl group, or an acetal, and n and m are, independently of each other, integers of 0 to 14, to an intramolecular sigmatropic rearrangement reaction to obtain a conjugated diene compound (4) of the following general formula (4):

(4)

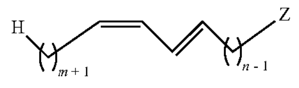

wherein Z is as defined above, and n and m are, independently of each other, integers of 0 to 14, with the proviso that n-1 is an integer of zero or more.

* * * * *